United States Patent [19]

Titus et al.

[11] Patent Number: 4,516,608

[45] Date of Patent: May 14, 1985

[54] TUBULAR MEMBER

[75] Inventors: Charles H. Titus, Newtown Square; John K. Wittle, Chester Springs, both of Pa.

[73] Assignee: Electro-Petroleum, Inc., Wayne, Pa.

[21] Appl. No.: 427,712

[22] Filed: Sep. 29, 1982

[51] Int. Cl.³ .................. F16L 9/14; F16L 9/10; F16L 11/18

[52] U.S. Cl. .................. 138/140; 138/120; 138/137; 138/155; 138/149

[58] Field of Search .................. 166/242; 138/120, 137, 138/140, 149, 155, 177, 141, 153; 222/591

[56] References Cited

U.S. PATENT DOCUMENTS

| | | | |
|---|---|---|---|
| 24,222 | 5/1859 | McBurney | 138/120 |
| 2,228,076 | 1/1941 | Flavin | 138/149 |
| 2,614,585 | 10/1952 | Wagstaff | 138/140 |
| 2,857,175 | 10/1958 | Browning et al. | 138/173 |
| 3,212,582 | 10/1965 | Brown | 166/242 |
| 3,234,723 | 2/1966 | Brown | 166/242 |
| 3,878,312 | 4/1975 | Bergh et al. | 174/9 F |
| 4,149,391 | 4/1979 | Driver | 138/120 |
| 4,259,993 | 4/1981 | Scholz | 138/155 |
| 4,349,050 | 9/1982 | Bergstrom et al. | 138/155 |

FOREIGN PATENT DOCUMENTS

| | | | |
|---|---|---|---|
| 235773 | 4/1960 | Australia | 138/137 |
| 1083262 | 9/1967 | United Kingdom | 222/591 |

*Primary Examiner*—John W. Shepperd
*Attorney, Agent, or Firm*—Dann, Dorfman, Herrell and Skillman

[57] ABSTRACT

An elongated tubular member for use in connection with a subterranean well, such as deep bore oil well, is comprised of at least two annular layers which may be bonded together. The first annular layer is comprised of a fiber reinforced organic resin material and the second layer is comprised of a refractory material. The two layers combined to provide an inexpensive, lightweight tubular member having relatively high compressive strength.

19 Claims, 4 Drawing Figures

TUBULAR MEMBER

BACKGROUND OF THE INVENTION

The present invention relates generally to a tubular member and, more particularly, to such a tubular member which is employed in connection with a subterranean well.

DESCRIPTION OF THE PRIOR ART

The use of epoxy resins and, particularly glass fiber-filled epoxy resins, in connection with subterranean wells, particularly where high intensity electrical fields and high temperature conditions are present, is well known in the art. U.S. Pat. No. 3,878,312 teaches the use of fiberglass-filled epoxy resin as a portion of the tubular liner around the interior of the bore hole of a deep bore subterranean oil well. The patent also teaches the use of a fiberglass-filled epoxy resin conduit for the transmission of fluid, such as saline water, into and out of the bottom of the well-bore hole for the purpose of oil recovery.

The advantages obtained in using such glass fiber-filled epoxy resins in connection with such wells are also well known. The glass fiber-filled expoxy resins provide an inexpensive, lightweight alternative to the steel conduits which had been previously used in such applications. In addition, the glass fiber-filled epoxy resin members are less susceptible to corrosion related failures. Moreover, the glass fiber-filled epoxy resin members are more elastic than the steel conduits employed in the past, thereby providing additional elasticity and load fluctuation damping.

Although such glass fiber-filled epoxy resin members have been used extensively, particularly in connection with the transmission of fluids into and out of subterranean oil wells, they are not suitable for all such applications due primarily to their inherent weakness in compression. The present invention provides a tubular member having all of the desirable features and advantages of the above-described prior art glass fiber-filled epoxy resin members while overcoming the inherent compressive-force weakness of such prior art members.

SUMMARY OF THE INVENTION

Briefly stated, the present invention provides an elongated tubular member for use in connection with a subterranean well, such as an oil well. The tubular member is comprised of a first elongated annular layer of a fiber reinforced organic resin material which may be bonded to a second elongated annular layer of refractory material. In the preferred embodiment, the organic resin is glass fiber-filled and the refractory material comprises a plurality of annular ceramic segments coupled or bonded together in end-to-end relation. A third layer, comprised of polytetrafluoroethylene, may be disposed between the first and second annular layers, if desired.

BRIEF DESCRIPTION OF THE DRAWINGS

The foregoing summary, as well as the following detailed description of preferred embodiments of the present invention, will be better understood when read in conjunction with the appended drawings, in which.

DESCRIPTION OF THE PREFERRED EMBODIMENTS

Figure 1:
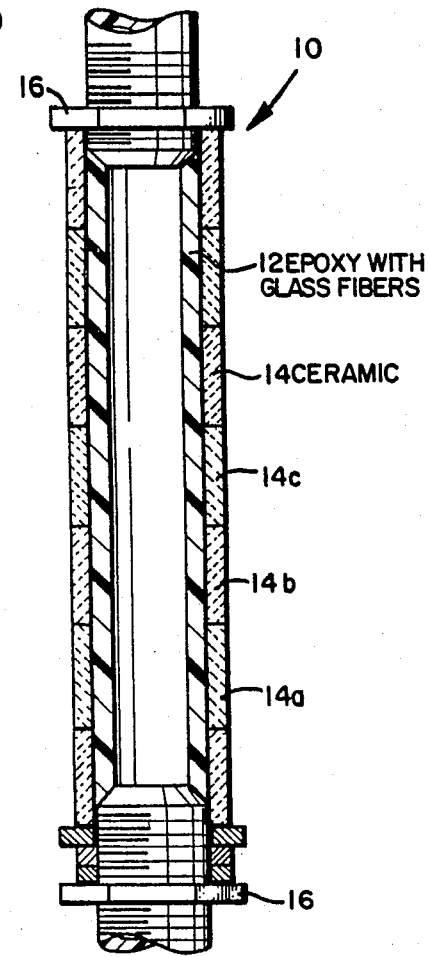
FIG. 1 is a sectional illustration of a sucker rod in accordance with the present invention.

Referring to the drawing, and particularly to FIG. 1, there is shown an elongated sucker rod 10 in accordance with the present invention. The sucker rod 10 may be employed as part of the driving means of a pumping system for the transmission of fluids such as oil into and out of a subterranean well, such as an oil well (see FIG. 3).

The sucker rod 10 is comprised of two annular layers of differing materials which may or may not be bonded together. The first or radially innermost layer 12 is comprised of a fiber reinforced organic resin, such as epoxy. In the present embodiment, the organic resin is glass fiber reinforced. However, other reinforcing materials, such as carbon, boron or metal, may be employed, if desired.

As discussed above, it is conventional in the art to use such glass fiber-filled epoxy material in prior art sucker rods. The use of such material in a sucker rod provides for inexpensive, lightweight sucker rods which are highly resistant to corrosion. Although fiberglass sucker rods are suitable when used in an application in which they are required to demonstrate high tensile strength, such prior art sucker rods are of limited value in other applications since they tend to bow if placed under a compressive load (such as may be caused by the end-to-end stacking of a plurality of such rods) due to the inherent compressive-force weakness of the fiberglass.

Figure 1A:
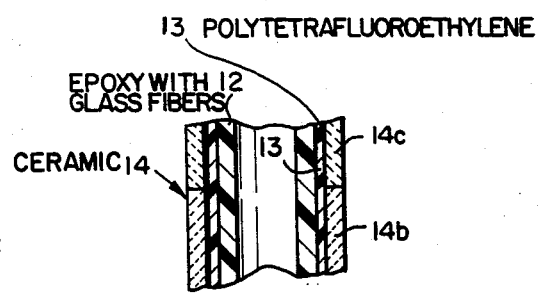
FIG. 1A is a fragmentary sectional illustration of a sucker rod on accordance with another embodiment of the present invention.

In order to overcome the inherent weakness of the prior art fiberglass-epoxy rods, sucker rod 10 further includes a second outer annular layer 14 comprised of a refractory material, such as ceramic which may or may not be bonded to the inner layer 12. The ceramic employed may be, for example, Coors Porcelain Company 99.5% Alumina. In the present embodiment, the outer layer 14 is formed of a plurality of individual annular ceramic segments (three of which are shown as 14a, 14b and 14c) coupled together in end-to-end relation. The ceramic segments may be attached together utilizing suitable commercially available cementing or bonding agent, such as Epiphen 825A. Alternatively, the ceramic segments may be maintained in place, as shown, utilizing suitable annular fittings or collars 16 at each end of the sucker rod 10. The collars 16 may be attached to the first annular layer 12 in such a manner that the annular ceramic segments are placed under a slight compression and the first annular layer 12 is under tension. As illustrated in FIG. 1A, an intermediate annular layer 13 of polytetrafluoroethelyne, known commercially as Teflon TM, may be provided between the first and second annular layers 12 and 14, respectively.

The remainder of the sucker rod 10 has substantially the same overall dimensional characteristics and structural configuration as was employed in the prior art sucker rods. However, by employing the second annular ceramic layer in the manner as described above, the sucker rod 10 may be used in applications where it is placed under a substantial compressive load (within the limits of the compressive strength of the outer ceramic layer 14), without suffering from the inherent weaknesses of the prior art sucker rods.

As described above, in the preferred embodiment, the outer layer of the sucker rod is comprised of a ceramic material having a composition of 99.5% alumina and the inner layer of the sucker rod is comprised of a glass fiber reinforced organic resin material. As such, in the preferred embodiment, the layers of the sucker rod are comprised of electrically non-conducting materials which are resistant to electrical stress.

Figure 2:
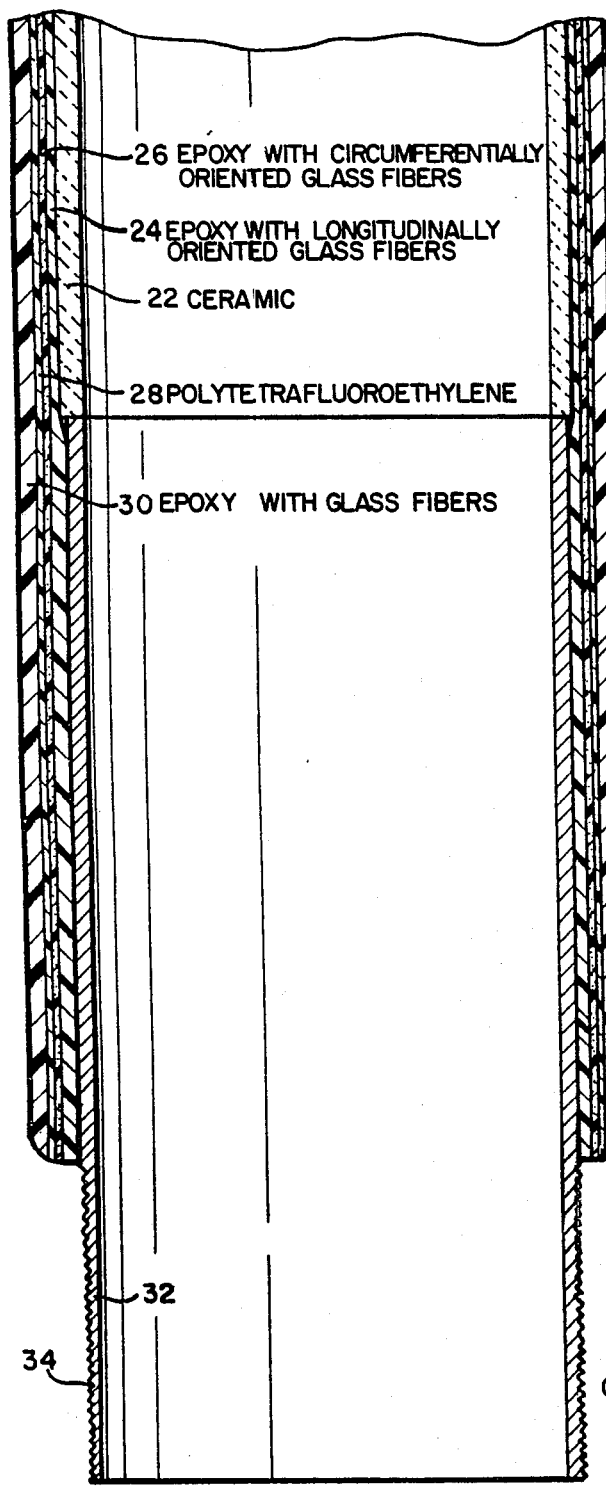
FIG. 2 is an enlarged sectional illustration of an insulated well-bore casing in accordance with the present invention.
Figure 3:
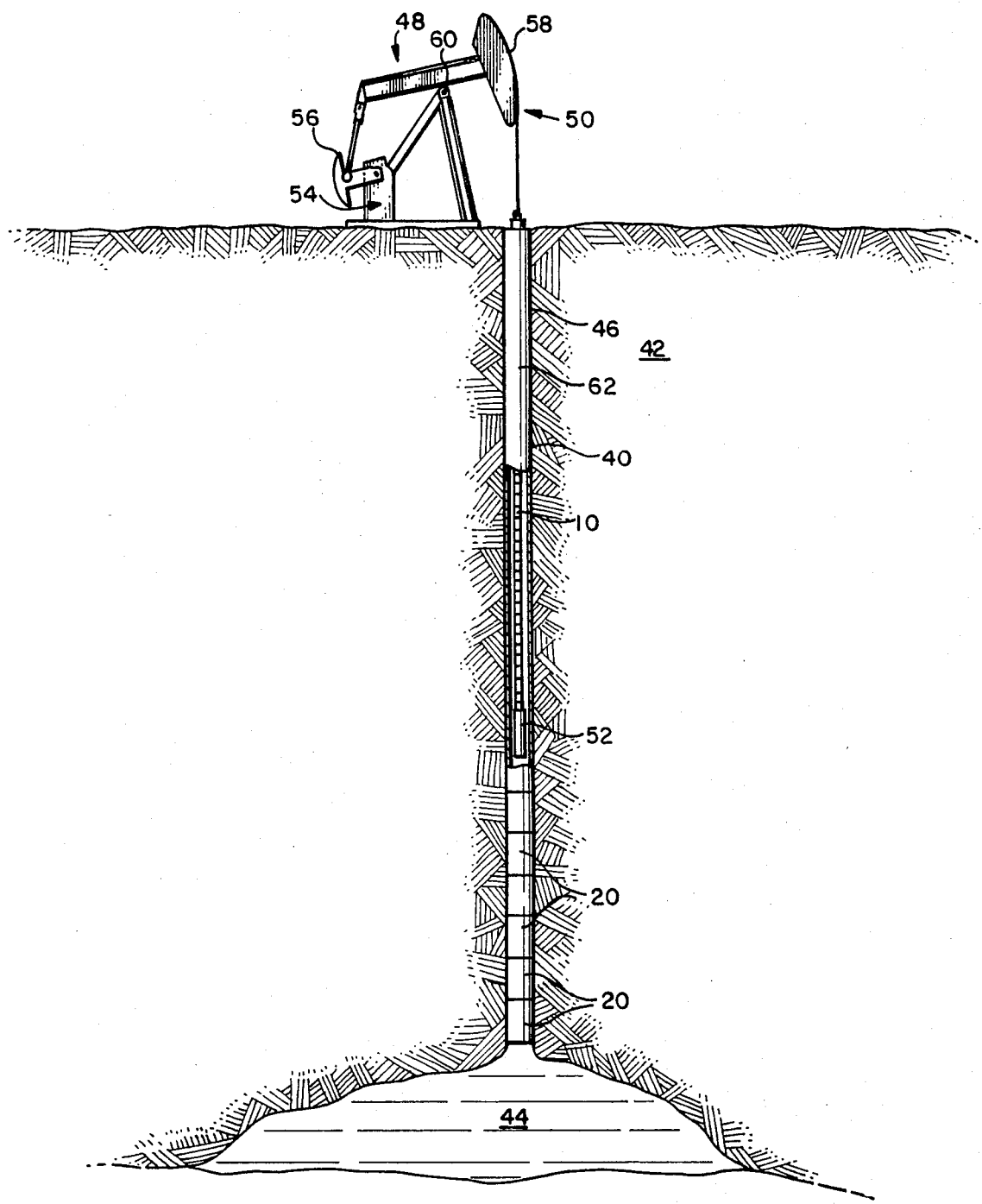
FIG. 3 is a schematic cross-sectional view through an underground oil bearing formation showing the sucker rod of FIG. 1 and the casing of FIG. 2 in operational usage.

Referring now to FIG. 2, there is shown a casing 20 for a subterranean well, such as an oil well (see also FIG. 3). As with the above-described sucker rod 10, the casing 20 comprises an elongated tubular member of multiple layers which are bonded together. The first or radially innermost layer 22 is comprised of a refractory material, such as ceramic. Although not shown in FIG. 2, the inner annular layer 22 may be formed of a plurality of annular ceramic segments as described above in connection with FIG. 1. The ceramic inner layer 22 provides extremely high compressive strength over the length of the casing 20 in the same manner as was described above in connection with the sucker rod 10.

Surrounding and bonded to the innermost annular layer 22 is a second annular layer 24 comprised of a fiber reinforced epoxy material, in the present embodiment a glass fiber-filled epoxy, with the fibers oriented in the longitudinal direction with respect to the casing 20. By orienting the fibers in the longitudinal direction, the tensile strength of the casing 20 is improved.

Surrounding the second annular layer 24 is a third annular layer 26 comprised of glass fiber-filled organic resin with the fibers oriented circumferentially (filament wound), that is, perpendicular to the longitudinally oriented fibers of the second layer 24. In this manner, the third layer 26 serves as an overlap layer to add additional tensile strength to the second layer 24.

Surrounding the third layer 26 is a fourth annular layer 28 comprised of polytetrafluoroethylene, known commercially as Teflon TM. As is described in detail in the above-identified patent, the Teflon TM is employed as a dielectric for the purpose of blocking ion migration and also serves to relieve the other layers of the voltage stress and thermal degradation which may occur in connection with the extraction of oil, particularly in connection with high intensity electrical fields and high temperature conditions. As is also described in the above-identified patent, the Teflon TM layer may be applied to the outside of the filament-wound, epoxy glass layer 26 in the form of tape or a heat shrunk sleeve.

Surrounding the Teflon TM layer 28 is an outer layer or overwrap 30 of glass-fiber-filled epoxy. The primary purpose of the outer layer is for mechanical protection of the inner layers 24, 26 and 28 of the casing 20. As describd above, in the preferred embodiment, each of the respective layers comprises a material which is electrically non-conducting and is resistant to electrical stress.

The lower end of the casing 20 includes a tubular steel segment 32 abuttng the lower end of the innermost ceramic layer 22 and extending downwardly to a position slightly below the lower end of the casing 20. The purpose of the steel segment 32 is to enable conventional steel casing members (not shown) to be attached to the casing 20. To this end, the outer surface of the steel segment 32 may include suitable threads as shown at 34.

Referring now to FIG. 3, there is shown a cross-sectional view of an underground oil bearing formation showing the sucker rod 10 and the casing 20 in operational usage. A well bore 40 extends downwardly from the earth's surface and penetrates through the overburden layer 42 and into a subterranean oil bearing formation 44. Most of the length of the well bore 40 is encased with a casing assembly 46 comprised of a plurality of individual casings 20 connected together in end-to-end relation. As discussed above, the casings 20 have a much greater compressive strength than the prior art casings which were comprised primarily of glass fiber filled epoxy resins.

A standard oil well pumping system 48 of the type well known in the art and commercially available is employed to withdraw the oil from the oil bearing formation 44 and transmit the oil to the surface. The pumping system 48 is comprised of a driving apparatus 50 positioned on the surface and a pumping apparatus 52 positioned within the well bore 40 and either in or slightly above the level of the oil bearing formation 44. The driving apparatus 50 includes a motor 54 which is connected by suitable motion-conversion means 56 to a pivoting drive head 58. The rotational motion of the output shaft of the motor 54 is converted by the motion-conversion means 56 to reciprocal motion which causes the drive head 58 to pivot up and down about its axis 60. The up and down motion of the drive head 58 is transferred down the well bore 40 by a sucker rod assembly 62 to operate the pumping apparatus 50. The sucker rod assembly 62 is comprised of a plurality of individual sucker rods 10 connected together in end-to-end relation.

From the foregoing description and the accompanying figures, it can be seen that the present invention provides a tubular member having all of the desirable features and advantages of the prior art glass fiber-filled epoxy resin structures and further including improved compressive strength. It will be recognized by those skilled in the art that changes or modifications may be made to the above-described embodiments without departing from the broad inventive concepts of the invention. It is understood, therefore, that this invention is not limited to the particular embodiments described, but it is intended to cover all changes and modifications which are within the scope and spirit of the invention as set forth in the appended claims.

We claim:

1. An elongated tubular member resistant to both tensile and compressive deformation and resistant to electrical stress comprised of a first annular layer of electrically non-conducting fiber reinforced organic resin material resistant to tensile deformation and a second annular layer of electrically non-conducting refractory material resistant to thermal degradation and compressive deformation.

2. An elongated tubular member resistant to both tensile and compressive deformation comprised of a first annular layer of fiber reinforced organic resin material resistant to tensile deformation and a second annular layer of refractory material resistant to thermal degradation and compressive deformation, said first and second layers being bonded together.

3. An elongated tubular member resistant to both tensile and compressive deformation comprised of a first annular layer of fiber reinforced organic resin material resistant to tensile deformation, a second annular layer of refractory material resistant to thermal degradation and compressive deformation; and collar means disposed at opposite ends of the first and second layers and in engagement with the first and second layers, said collar means simultaneously maintaining the first annular layer of fiber reinforced organic resin material in tension and the second annular layer of refractory material in compression.

4. The structure as recited in claims 1, 2, or 3 wherein the refractory fiber is glass.

5. The structure as recited in claim 1, 2 or 3 wherein said tubular member comprises a sucker rod for use in connection with the pumping of fluids out of a subterranean well and wherein the first annular layer is positioned radially inside of the second annular layer.

6. The structure as recited in claim 5 wherein the second layer is comprised of a plurality of segments coupled in end-to-end relation.

7. The structure as recited in claim 6 wherein the anular segments are ceramic.

8. The structure as recited in claim 1, 2 or 3 wherein said tubular member comprises a casing for a subterranean well and wherein the second annual layer is positioned radially inside of the first annular layer.

9. The structure as recited in claim 1, 2 or 3 wherein the second layer is comprised of a plurality of annular ceramic segments coupled in end-to-end relation.

10. The structure as recited in claim 1, 2 or 3 comprising an annular layer of a dielectric polymer film disposed between the first annular layer of fiber reinforced resin and the second annular layer of refractory material to increase the dielectric strength of the tubular member.

11. The structure as recited in claim 10 wherein the dielectric polymer film is polytetrafluoroethylene.

12. The structure as recited in claim 1 including collar means disposed at opposite ends of the first and second layers in engagement with the first and second layers for maintaining said second layer in compression and said first layer in tension.

13. The structure as recited in claim 1, 2 or 3 comprising a third annular layer of fiber reinforced resin material disposed between said first annular layer of fiber reinforced resin material and said second annular layer of refractory material.

14. The structure as recited in claim 13 comprising a fourth annular layer of fiber reinforced resin material disposed between the first and third annular layers of fiber reinforced resin material.

15. The structure as recited in claim 14 wherein one of said third and fourth annular layers of fiber reinforced resin material includes reinforcing fibers oriented generally longitudinally of said structure and the other annular layer includes reinforcing fibers oriented generally circumferentially of said structure.

16. The structure as recited in claim 15 wherein said reinforcing fibers of the third annular layer are oriented longitudinally and said reinforcing fibers of the fourth annular layer are oriented circumferentially.

17. The structure as recited in claim 14 comprising a fifth annular layer of dielectric polymer film disposed between said first annular layer of fiber reinforced resin material and said second annular layer of refractory material.

18. The structure as recited in claim 17 wherein said fifth annular layer is disposed between said first and fourth annular layers of fiber reinforced resin material.

19. The structure as recited in claim 17 wherein the dielectric polymer film is polytetrafluoroethylene.

* * * * *